Patented Jan. 1, 1929.

1,697,713

UNITED STATES PATENT OFFICE.

HANS BUCHERER, OF CHARLOTTENBURG, NEAR BERLIN, PRUSSIA, GERMANY.

PROCESS FOR THE PRODUCTION OF NEW DERIVATES OF THE CONDENSATION PRODUCTS OF ALDEHYDES AND PHENOLS.

No Drawing. Application filed April 18, 1921, Serial No. 462,369, and in Germany June 10, 1918.

Applications for patents have been filed in Germany, June 10, 1918 and March 22, 1919; in Czechoslovakia July 7, 1920; in Great Britain, July 9, 1920; in Italy, July 9, 1920; in Belgium, July 10, 1920; in France, July 10, 1920; in Switzerland, July 13, 1920; in Austria, July 14, 1920; in Netherlands, July 30, 1920; and in Poland, October 30, 1920.

In practice the use of the products of a generally resinous character obtained by the condensation of formaldehyde and phenols, which have been introduced for a number of years under various names, is restricted to a certain extent owing to the fact that their properties as to solubility often do not meet technical requirements. For this reason the production of lacquers when the usually cheap solvents are used is difficult. Furthermore, paintings, coatings and the like, after evaporation of the solvent in many cases exhibit a troublesome sensitivity to alkalis.

It has now been found that these difficulties and disadvantages may be overcome, by subjecting the products of condensation, (on account of the capability of reaction of the open hydroxyl groups of a phenolic character) to a radical transformation which consists in that the open hydroxyl groups are closed i. e. that the hydrogen of the hydroxyl groups is replaced by organic radicles. If this closure is effected with molecules having several open hydroxyl groups in a perfect manner, the resinous condensation products lose their solubility in alkali. At the same time, however, the conditions as regards solubility in organic solvents alter, and it is possible, by the choice of suitable organic radicles to influence the solubility to a great extent and to adapt them to the use to which they are to be put. Finally the closure of the open hydroxyl groups by alkyls, aralkyls, aryl radicles and the like, which may be effected according to the methods well known in themselves, has also a useful action in so far as the auxochrome character of the hydroxyl groups is weakened by the introduction of an organic radicle in the place of hydrogen, so that in many cases the undesirable subsequent darkening of the original condensation products is less noticeable.

*Example 1.*

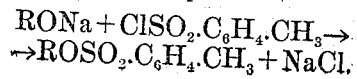

100 kg. of the condensation product obtained from formaldehyde and cresol, (technical mixtures of the three isomers) are dissolved in a sufficient quantity of dilute alkali (at least an equivalent) and thereupon treated with 100 kg. of calcined soda. The solution is preferably heated to between 70 and 100° C. and gradually para-toluene-sulpho-chloride is added until the original condensation product has disappeared from the alkaline solution execept for small traces. The toluene sulpho-acid ester is separated out in the form of a resin which solidifies on cooling, and is fairly soluble in cold benzene. Instead of obtaining the ester in the above mentioned manner it may also be obtained by mixing together the condensation products and the amount of toluene sulpho-chloride in the amounts required and introducing this mixture in dilute alkali solution heated to about 70 to 100° C. In the last case prolonged heating must be avoided in order to prevent subsequent decomposition of the ester by an excess of alkali.

Finally the ester may also be formed, in the absence of water, by the action of toluene sulpho-chloride upon the sodium salt of the condensation products, or by subjecting the aldehyde resin in an inert solvent or diluent, in the presence of calcined soda, to the action of the sulpho-chloride.

*Example 2.*

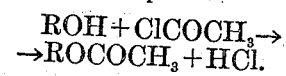

100 kg. of the condensation product obtained from formaldehyde and phenol are carefully heated under a reflux condenser with 150 kg. of acetyl-chloride until the acetylation is completed. Thereupon the excess of acetyl-chloride is completely distilled through an ordinary condenser. The residue, the acetylester, which contrary to the initial material is insoluble in dilute alkali is easily soluble for example in benzene, toluene, xylene and tetralene.

Corresponding to the differently constituted initial materials, the present acetyl compound does not exactly correspond as regards solubility and melting point with the product of reaction obtained from Novo-varnish and acetic anhydride (see the Chem. Ztg. 33 (1909) page 858, col. 2 below); it is however very easily soluble in cold acetone,

Example 3.

$$RONa + ClCOC_6H_5 \rightarrow$$
$$\rightarrow ROCOC_6H_5 + NaCl.$$

Like acetyl chloride, benzoyl chloride also reacts fairly easily with the aldehyde resins. However, by using alkali-binding agents one can also work in such manner that the aldehyde resin is dissolved in aqueous alkali and caused to react with the requisite quantity, (about 40, 75 or 100 per cent of the theoretical) of benzoyl-chloride at temperature between about 50 and 100° C. The separated benzoyl resin which is insoluble in alkali, is easily soluble in benzene, toluene and the like and carbon tetrachloride.

Example 4.

$$RONa + ClCH_2C_6H_5 \rightarrow$$
$$\rightarrow ROCH_2C_6H_5 + NaCl.$$

The capacity of the aldehyde resins for reacting with benzyl-chloride is remarkable. The resins are dissolved in an excess of aqueous alkali and the benzyl-chloride is poured in under constant stirring at a temperature about 90 to 95° C. A brisk reaction takes place and after quite a short time the benzylated resin separates out. The heating is prolonged for sometime until the smell of benzyl chloride has disappeared. If about equal parts of cresol, aldehyde-resin, and benzyl-chloride are used a new resin is obtained which is very soluble even in the cold in tetrachlorethane, trichlorethylene, carbon tetrachloride, benzene and its homologues, castor oil, linseed oil, and resin oil.

Example 5.

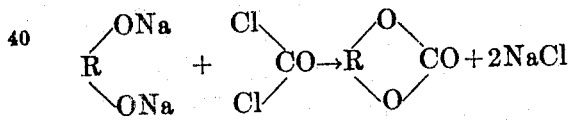

or $$RONa + ClCOCl + NaOR \rightarrow$$
$$\rightarrow ROCOOR + 2NaCl.$$

The action of phosgene $COCl_2$ upon an alkaline solution of the aldehyde resins is exceedingly brisk. Even at ordinary temperature it is almost instantaneous, it being immaterial whether the phosgene is introduced in gaseous form into the aqueous alkaline resin solution or employed in solution in toluene. Also in the absence of an acid binding-agent phosgene acts upon the aldehyde resins, similarly to acetyl and benzoyl chloride (see above). The phosgene derivatives of the aldehyde resins (carbonic acid esters) are of special interest in view of their remarkable physical properties. They are not only insoluble in alkali and soda and dissolved only with extreme difficulty, if at all, by the usual organic solvents, but, in contradistinction to the acyl derivatives mentioned in the above example, they also possess an extraordinary high melting point which is of use for special industrial purposes. Inasmuch as their production under suitable conditions of reaction (see above) is almost instantaneous, the new products may also be produced upon suitable bases (textile fibres, wood, paper, and the like for example) by soaking these bases with an alkaline solution of the aldehyde resins and, after drying, if desired, exposing them to the action of phosgene. The new compounds are precipitated at once in insoluble form upon the bases in a similar manner to the socalled ice colours in the dyeing industry.

Example 6.

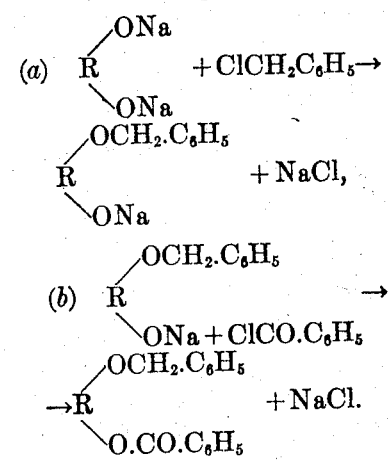

If in Example 4 instead of the equivalent amount (one molecule benzyl chloride for each hydroxyl group) only one half or three-quarters of the benzyl chloride is used, intermediate products are obtained in which one half or one quarter of the hydroxyl groups remain open i. e. not closed by the benzyl radicle. If benzoyl- or acetyl-chloride are caused to react upon these intermediary products in the presence of an alkali-binding agent, after they have been dissolved (for example in benzene or toluene) mixed substituted aldehyde resins are obtained. Similarly if phosgene instead of benzoyl chloride is used as second component for closing the hydroxyl groups, products are obtained which may possibly also be regarded as carbonic-acid derivatives, the solubility of which, however, for instance in toluene or benzene, and carbon tetra chloride, has not been impaired.

Further extension of the inventive idea leads to the employment, for closing the OH-groups, of compounds, which do not have any great influence on the conditions of solubility of the reaction products (in organic agents and in alkali) but which are endowed with certain valuable properties and activities such for example as valerianic acid and bromvalerianic acid, cinnamic acid, salicylic acid, mandelic acid, and many other carboxyl acids, which are known to have curative properties. To effect the above-mentioned purpose all that is necessary is to transform the compounds selected for use in closing the OH-groups, in the usual manner into a suitably active form (for the carboxylic acids this is generally the acid chloride), which will enable them to penetrate into the OH-groups. A second condition is that the special activities of the compounds in question are retained by the closing radicle or by the whole molecule, or can be brought into operation at the desired time.

Having now described and set forth the nature of my invention and the manner in which the same is to be performed I now declare what I claim and desire to secure by Letters Patent of the United States is:

1. The process for the production of new derivatives of resinous condensation products of aldehydes and phenols containing hydroxyl groups, consisting in reacting on such condensation products with halogenous organic compounds, containing halogenous atoms capable of chemically reacting to cause the organic residue combined with the halogen in such compounds to replace the hydrogen of the hydroxyl groups in such products.

2. The process for the production of new derivatives of resinous condensation products of formaldehyde and phenols containing hydroxyl groups, consisting in reacting on such condensation products with halogenous organic compounds containing halogenous atoms capable of chemically reacting to cause the organic residue combined with the halogen in such compounds to replace the hydrogen of the hydroxyl groups in the condensation products.

3. The process for the production of new derivatives of resinous condensation products of aldehydes and phenols containing hydroxyl groups, consisting in reacting on such condensation products with halogenous organic compounds which differ between themselves but which contain halogenous atoms capable of chemically reacting to cause the organic residues combined with the halogen in such compounds to replace the hydrogen of the hydroxyl groups in the condensation products.

4. The process for the production of new derivatives of resinous condensation products of aldehydes and phenols containing hydroxyl groups, consisting in reacting on such condensation products with halogenous organic acid chlorides having halogenous atoms capable of chemically reacting to cause the organic residue combined with the halogen in such chlorides to replace the hydrogen of the hydroxyl groups in the condensation products.

5. The process for the production of new derivatives of resinous condensation products of aldehydes and phenols containing hydroxyl groups, consisting in reacting on such condensation products with halogenous organic compounds which possess properties and activities which are also manifested in the new condensation products, and contain halogenous atoms capable of chemically reacting to cause the organic residue combined with the halogen in such compounds to replace the hydrogen of the hydroxyl groups in the condensation products.

6. As a new composition of matter, derivatives obtained from condensation products of aldehydes and mono-valent phenols containing hydoxyl groups, the hydrogen of the hydroxyl groups in the derivatives being replaced by organic residues, the said derivatives being insoluble in alkalies and more readily soluble in organic solvents, substantially as described.

7. As a new composition of matter, derivatives of condensation products of aldehydes and mono-valent phenols containing hydroxyl groups, the hydrogen of the hydroxyl groups in the derivatives being partially replaced by organic residues, said derivatives having to a reduced extent the faculty of forming alkali phenolates soluble in water, and the hydrogen atoms of the hydroxyl groups present therein being capable of replacement by further organic residues different from the first stated residues.

8. As a new composition of matter the derivatives of condensation products of aldehydes and mono-valent phenols chemically condensed with chemically reactive halogenous organic compounds, substantially as described.

9. The method which comprises reacting an alkali soluble resinous condensation product of a mono-valent phenolic body and an aldehyde with an organic halogen compound the halogen of which compound is capable of combining with hydrogen of the phenolic groups of the condensation product whereupon the said hydrogen will be replaced by an organic radical.

10. The method which comprises reacting an alkali soluble condensation product of a mono-valent phenolic body and an aldehyde with an organic acid compound which is capable of replacing the hydrogen of the phenolic groups present with an organic acid radical.

11. The method which comprises reacting an alkali soluble resinous condensation product of a mono-valent phenolic body and an aldehyde with an organic acid chloride.

12. The method which comprises reacting an alkali soluble condensation product of a mono-valent phenolic body and an aldehyde with an aromatic sulfochloride.

13. The method of claim 12 in which the alkali soluble condensation product is a condensation product of a phenol and formaldehyde.

14. The method of claim 12 in which the alkali soluble condensation product is a phenol alcohol.

15. The method of claim 12 in which the aromatic sulfochloride is a toluene sulfochloride.

16. The process of claim 12 in which the reaction between the alkali soluble condensation product and the sulfochloride is carried out in the presence of alkali.

17. A derivative of an alkali soluble condensation product of a mono-valent phenolic body and an aldehyde in which the hydrogen of the phenolic groups is replaced by an organic acid radical.

18. A derivative of an alkali soluble condensation product of a mono-valent phenolic body and an aldehyde in which the hydrogen of the phenolic group is replaced by an aromatic sulphonic acid radical.

In testimony whereof, I have signed my name to this specification.

HANS BUCHERER.